UNITED STATES PATENT OFFICE.

CALLAHILL ATKINS, OF PIKEVILLE, ASSIGNOR OF ONE-HALF TO STEPHEN M. FERGUSON, OF FLOYD COUNTY, KENTUCKY.

MEDICINE FOR SCROFULA.

SPECIFICATION forming part of Letters Patent No. 280,281, dated June 26, 1883.

Application filed April 2, 1883. (No specimens.)

*To all whom it may concern:*

Be it known that I, CALLAHILL ATKINS, a citizen of the United States, and residing at Pikeville, in the county of Pike and State of Kentucky, have invented certain new and useful Improvements in Medical Compounds; and I do hereby declare that the following is a full, clear, and exact description of the invention, which will enable others skilled in the art to which it appertains to make and use the same.

My discovery has relation to that class of medical compounds which are administered in the treatment of scrofula or "King's evil;" and it consists in a purely vegetable compound of the ingredients hereinafter named, viz: I take one ounce each of black-pine buds, (*Germina pinus nigræ,*) tulip-tree bark, (*Cortex liriodendron,*) sarsaparilla, (*Sarsaparilla,*) wild comfrey-root, (*Radix symphyti officinalis,*) golden seal, (*Hydrastis Canadensis,*) wild silk-weed, (*Asclepias Syriaca,*) magnolia-bark, (*Cortex magnoliæ,*) and dandelion-root, (*Radix taraxaci dens leonis.*) These several ingredients, in a dry state, are first comminuted or reduced to a coarse powder, after which one and one-half pint of alcohol is added. After steeping thoroughly, this is filtered, and two gallons of water is added, which by evaporation is reduced to one gallon, to which I add eight pounds of refined sugar. If desired, a sirup may be formed of the sugar and water, evaporating half the quantity of the water, and then adding the tincture to the sirup, which should be again subjected to the action of heat until all the alcohol is vaporized, after which the sirup is filtered, when it is ready for use.

I prefer to use this compound in doses of one tea-spoonful for children and one table-spoonful for adults, three times a day.

I am well aware that several of the ingredients hereinbefore named have been used, either singly or in different combinations, in the preparation of medical compounds; but

What I claim, and desire to secure by Letters Patent of the United States, is—

The medical compound, herein described, composed of a sirup containing tincture of the following ingredients, viz: black-pine buds, (*Germina pinus nigræ,*) tulip-tree bark, (*Cortex liriodendron,*) sarsaparilla, (*Sarsaparilla,*) wild comfrey-root, (*Radix symphyti officinalis,*) golden seal, (*Hydrastis Canadensis,*) wild silk-weed, (*Asclepias Syriaca,*) magnolia-bark, (*Cortex magnoliæ,*) and dandelion-root, (*Radix taraxaci dens leonis,*) in the proportions specified.

In testimony that I claim the foregoing as my own I have hereunto affixed my signature in presence of two witnesses.

CALLAHILL ATKINS.

Witnesses:
   O. C. BOWLES,
   A. J. HATCHER.